(12) United States Patent
Mongold (10) Patent No.: US 11,375,701 B1
(45) Date of Patent: Jul. 5, 2022

(54) WEED GUARD FOR FISHING HOOK

(71) Applicant: John A. Mongold, Huntington, PA (US)

(72) Inventor: John A. Mongold, Huntington, PA (US)

( * ) Notice: Subject to any disclaimer, the term of this patent is extended or adjusted under 35 U.S.C. 154(b) by 191 days.

(21) Appl. No.: 16/775,437

(22) Filed: Jan. 29, 2020

Related U.S. Application Data (60) Provisional application No. 62/798,741, filed on Jan. 30, 2019.

(51) Int. Cl.
*A01K 85/02* (2006.01)

(52) U.S. Cl.
CPC .................................. *A01K 85/02* (2013.01)

(58) Field of Classification Search
CPC ......................................................... A01K 85/02
USPC .......................................................... 43/42.4
See application file for complete search history.

(56) References Cited

U.S. PATENT DOCUMENTS

| | | | | |
|---|---|---|---|---|
| 2,319,686 A * | 5/1943 | Janisch | ............ | A01K 85/02 43/42.43 |
| 2,385,986 A * | 10/1945 | Helfenstein | ............ | A01K 85/02 43/42.4 |
| 2,735,210 A * | 2/1956 | Hinkal | ............ | A01K 85/02 43/43.6 |
| 2,989,816 A * | 6/1961 | Ebert | ............ | A01K 85/02 43/42.4 |
| 3,640,014 A * | 2/1972 | Gurka | ............ | A01K 85/02 43/42.43 |
| 3,662,485 A * | 5/1972 | Klemkowski, Jr. | ..... | A01K 85/14 43/42.34 |
| 5,077,931 A * | 1/1992 | Marshall | ............ | A01K 85/14 43/42.4 |
| 5,822,913 A * | 10/1998 | Lau | ............ | A01K 85/00 43/42 |
| 5,950,350 A * | 9/1999 | Norton | ............ | A01K 85/02 43/43.6 |
| 5,983,554 A * | 11/1999 | Storey | ............ | A01K 85/02 43/42.42 |
| 6,032,402 A * | 3/2000 | Jilling | ............ | A01K 83/00 43/42.4 |
| 8,490,320 B1* | 7/2013 | Roberts | ............ | A01K 85/01 43/42.5 |
| 9,521,832 B1* | 12/2016 | Pack | ............ | A01K 85/02 |
| 2009/0282725 A1* | 11/2009 | Kuhlman | ............ | A01K 83/00 43/34 |
| 2012/0017488 A1* | 1/2012 | Partridge | ............ | A01K 85/02 43/42.36 |
| 2013/0047492 A1* | 2/2013 | Frederick | ............ | A01K 83/02 43/43.2 |
| 2018/0360011 A1* | 12/2018 | Fletcher | ............ | A01K 83/02 |

FOREIGN PATENT DOCUMENTS

| | | | | |
|---|---|---|---|---|
| CA | 2153470 A1 * | 1/1996 | ............ | A01K 85/02 |
| WO | WO-9852407 A1 * | 11/1998 | ............ | A01K 85/02 |

* cited by examiner

*Primary Examiner* — Christopher P Ellis (57) ABSTRACT

A weed-guarded hook assembly includes a first weed guard body that is attached to a fishing hook. The first weed guard body defines at least one aperture that is configured to receive a weed guard member. The weed guard member can extend through an eyelet so as to define first and second segments of the weed guard member. The first segment can extend into a first aperture of the first weed guard body, and the second segment can extend into a second aperture of the first weed guard body.

20 Claims, 4 Drawing Sheets

WEED GUARD FOR FISHING HOOK

CROSS-REFERENCE TO RELATED APPLICATIONS

This claims priority to U.S. Patent Application Ser. No. 62/798,741 filed Jan. 30, 2019, the disclosure of which is hereby incorporated by reference as if set forth in its entirety herein.

BACKGROUND

Experienced and inexperienced anglers alike are familiar with the frustrations of weeds, trees, and brush. Common fishing techniques include fishing the weed beds and brushes, and in the waters that surround weed beds, brushes, and trees. These techniques recognize that many species of predatory fish hide in these areas awaiting their prey. However, such fishing techniques subject the fishing hook to the perils of entanglement with the weeds, brushes, and trees. Further, even when not fishing in such areas, it is not uncommon for the fishing hook to encounter debris in the water, such as wood from tree branches, weeds, brushes, and the like. It is not uncommon for the hook to become snagged, thereby substantially reducing the likelihood of a fish bite. In some instances, the hook can be freed and the lure saved. In some instances, however, the hook will catch. In severe instances, the hook is unable to be freed or drawn in, and the line should therefore be cut. Needless to say, this requires a new hook or lure to be attached to the fishing line, which wastes valuable time and a potentially costly fishing lure.

So-called weedless hooks have a weed guard that is designed to glide over and around weeds, brushes, trees, and wood, thereby protect the hook and reducing the likelihood that the hook will snag. However, most conventional weed guards are disposed immediately above the distal end of the hook, which exposes the sides of the hook to the weed bed. Further, the position and height of most conventional weed guards are not adjustable.

SUMMARY

In accordance with one aspect of the present disclosure, a weed guard body is disclosed for use in a weed-guarded fishing hook assembly. The weed guard body is configured to attach to a fishing hook, and defines a first end and a second end opposite the first end. The weed guard body can include a central attachment member, a first outer member, and a second outer member. The central attachment member can be configured to receive the fishing hook at the first end such that a free end of the fishing hook extends out the second end. The first guide body can define a first outer aperture that extends at least into the first outer member so as to define a first opening. The first guide body can further define a second outer aperture that extends at least into the second outer member so as to define a second opening. The central attachment member can be disposed between the first and second outer members. At least one of the first and second openings can be configured to receive a respective end of a guard member that extends through an eyelet.

DETAILED DESCRIPTION

Figure 1:
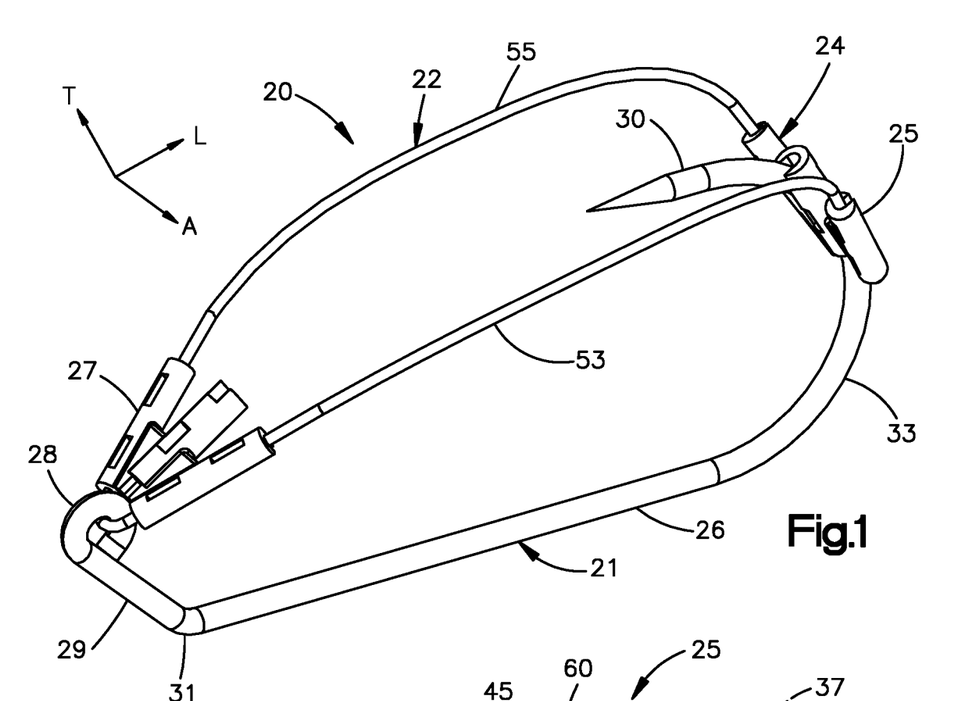
FIG. 1 is a perspective view of a weed-guarded hook assembly including a fishing hook, a first weed guard body, a second weed guard body, and a guard member that extends through an eyelet, and is attached to each of the first weed guard body and the second weed guard body.

Referring initially to FIG. 1, a weed-guarded fishing hook assembly 20 includes a fishing hook 21, a weed guard member 22, and at least one weed guard body 25 that is configured to attach to or otherwise support the guard member 22 at a position relative to the fishing hook 20 so as to reduce instances of entanglement of the hook with weeds during use. The at least one weed guard body 24 can include a first weed guard body 25 and a second weed guard body 27.

Figure 3A:
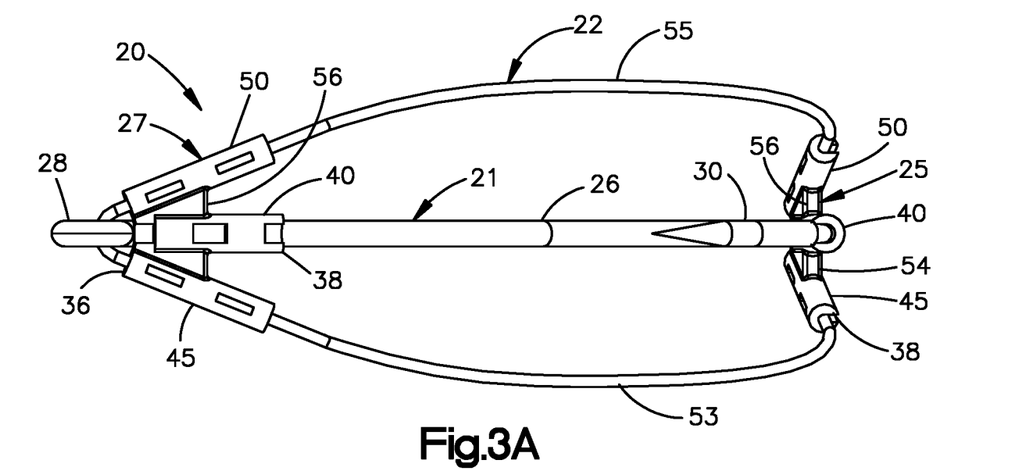
FIG. 3A is a top plan view of the weed-guarded hook assembly illustrated in FIG. 1.
Figure 3B:
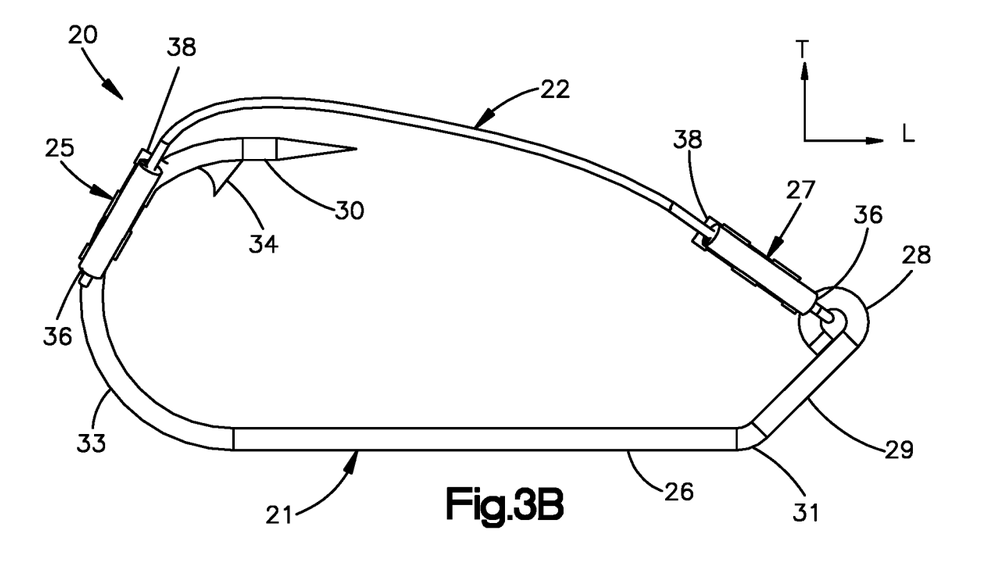
FIG. 3B is a side elevation view of the weed-guarded hook assembly illustrated in FIG. 3A.

The fishing hook 21 can include a stem 26, a proximal end 29, and a free distal end 30 opposite the proximal end 29. The fishing hook can further include an eyelet 28 at the proximal end 29 of the fishing hook 21. The eyelet 28 can extend proximally from the stem 26. The free distal end 30 can extend from the stem 26 at a location opposite the proximal end 29. Thus, the stem 26 can be disposed between the proximal end 29 and the distal end 30. For instance, the stem 26 can extend along a longitudinal direction L of the hook 21. In some examples, the fishing hook 21 can include a proximal interface 31 that extends from the stem 26 to the proximal end 29. The proximal interface 31 can define a bent elbow that is angularly offset with respect to the stem 26. Alternatively, the eyelet 28 can be inline with the stem 26. The fishing hook 21 can define a distal interface 33 that is bent at a location between the stem 26 and the distal end 30. For instance, the distal interface 33 can be configured as a U-shaped bend along a transverse direction T of the hook that is substantially perpendicular to the longitudinal direction L of the hook. Thus, the distal end 30 can be spaced from the stem 26 along the transverse direction T of the hook so as to define a gap therebetween. In one example, the distal end 30 can be aligned with the stem 26 along the transverse direction T of the hook. In other examples, the distal end 30 can be bent so as to be offset from the stem 26 with respect to a lateral direction A of the hook that is substantially perpendicular to each of the transverse direction T and the longitudinal direction L. Either way, the distal end 30 can be said to be spaced from the stem 26 along the transverse direction T. The distal end 30 can include a barb 34 (see FIG. 3B) to help prevent the hook 21 from backing out from the fish after a fish has struck the hook. The fishing hook 21 is typically metallic, though it should be appreciated that the fishing hook 21 can be made from other materials such as plastic.

Figure 2A:
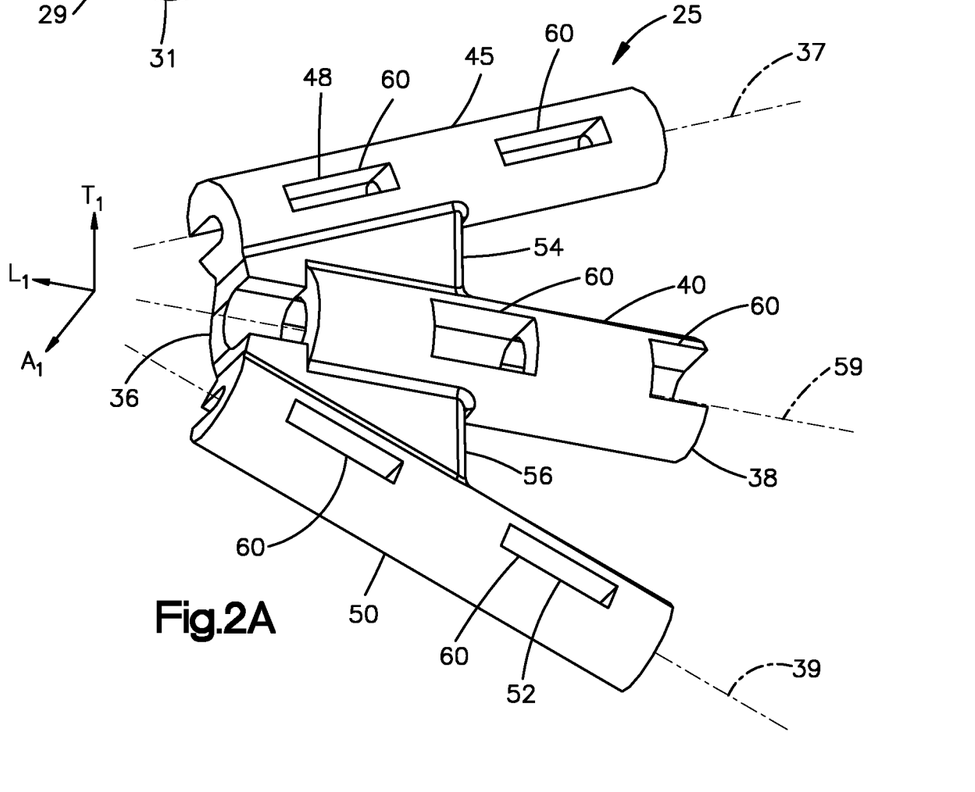
FIG. 2A is a perspective view of the first weed guard body of the weed-guarded hook assembly illustrated in FIG. 1, shown constructed in accordance with one example.
Figure 2B:
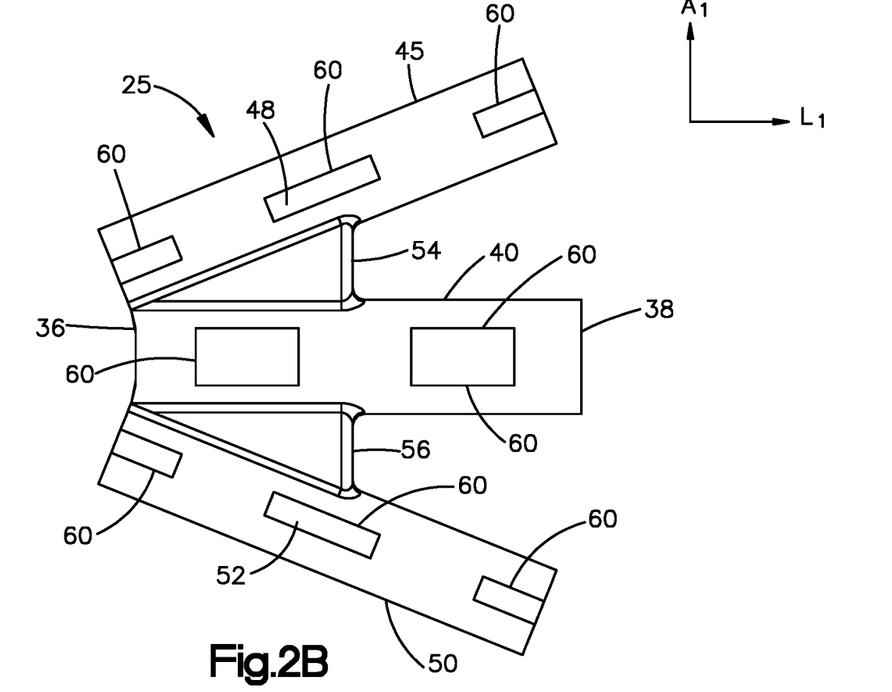
FIG. 2B is a top plan view of the first weed guard body illustrated in FIG. 2A.
Figure 2C:
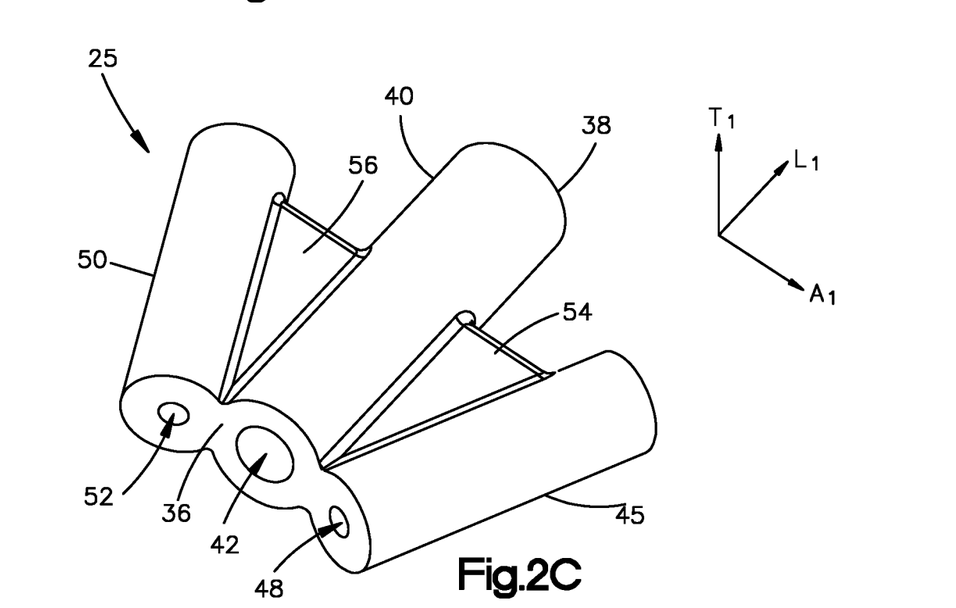
FIG. 2C is another perspective view of a first weed guard body similar to the first weed guard body illustrated in FIGS. 2A-2B, but constructed in accordance with an alternative embodiment.

Referring now also to FIGS. 2A-2C, the first weed guard body 25 is configured to attach to the fishing hook 21 so as to support the guard member 22 in a desired position with respect to the hook 21, as described in more detail below. In particular, the guard member 22 can extend from an eyelet and span at least a portion up to an entirety of the stem 26, and can attach to the first weed guard body 25 that is attached to the hook 21. The first weed guard body 25 defines a first end 36 and a second end 38 opposite the first end 36 generally along a longitudinal direction L1 of the weed guard body 25. A direction from the first end 36 toward the second end 38 can be referred to as a forward direction. The forward direction can be aligned with the longitudinal direction L1, or can be angularly offset with respect to the longitudinal direction L1. The terms "forward," "front," and derivatives thereof as stated herein are made with reference to the forward direction. A direction from the second end 38 toward the first and 36 can be referred to as a rearward direction. Thus, the terms "rearward," "rear," and derivatives thereof as stated herein are made with reference to the rearward direction. Accordingly, the second end 38 can be referred to as a front end of the first weed guard body 25, and the first end 36 can be referred to as a rear end of the first weed guard body 25.

In one example, the first guard body 25 can define a hook attachment member 40 that is configured to attach the first guard body 25 to the fishing hook 21. In one example, the hook attachment member 40 can include a hook attachment aperture 42 that is configured to receive the fishing hook 21. A bent portion of the fishing hook 21 can extend through the hook attachment aperture 42. Alternatively, the distal end 30 can extend through the hook attachment aperture 42. In this regard, the hook attachment member 40 can be configured as a hook attachment tube. The hook attachment aperture 42 can extend at least into the first end 36 of the weed guard body 25 along a hook attachment aperture axis 59. The hook attachment aperture axis can be oriented along the longitudinal direction L1. The hook attachment aperture 42 can be sized to receive the free distal end 30 of the fishing hook 21. The hook attachment aperture 42 can be configured to receive the free distal end 30 of the fishing hook 21 at the first end 36 of the first weed guard body 25. Thus, the free distal end 30 of the hook 21 can extend out the second end 38 of the first weed guard body 25. In one example, the first weed guard body 25 can be positioned at the distal interface 33.

The aperture 42 can have a cross-sectional dimension sufficient to cause the hook to be press-fit therein. Thus, the cross-sectional dimension of the aperture 42 can be slightly less than that of the hook. The first guard body 25 can be a compressible, flexible, or elastic material so as to apply a retention force against the hook 21 that extends into or through the hook attachment aperture 42.

In one example, the hook attachment aperture 42 can extend through the first guard body 25 from the first end 36 to the second end 38. In another example the hook attachment aperture 42 can terminate between the first and second ends 36 and 38 of the first guard body 25 prior to attachment of the first guard body 25 to the hook 21. Thus, the distal end 30 of the hook 21 can extend into the hook attachment aperture 42 and pierce the first guard body 25 as it is driven through the first guide from the hook attachment aperture 42 to the first end 36 of the first weed guard body 25. In this regard, it should be appreciated that the first guard body 25 can be devoid of the hook attachment aperture 42 prior to attachment to the hook 21. Thus, the distal end 30 of the hook 21 can pierce through the first guard body 25 from the second end 38 to the first end 36 so as to attach the first guard body 25 to the hook 21.

Figure 4A:
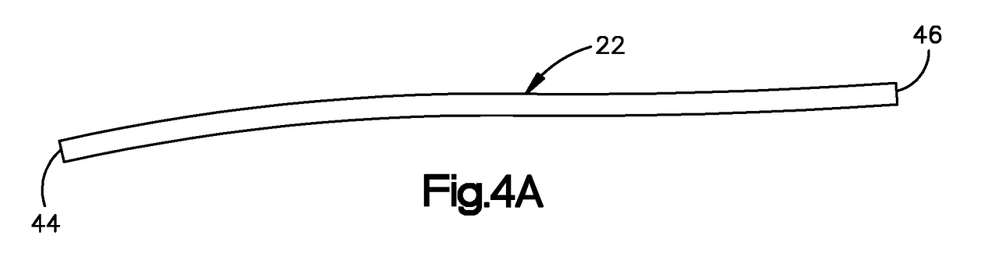
FIG. 4A is a side elevation view of the weed guard member illustrated in FIG. 1, constructed in accordance with one embodiment.
Figure 4B:
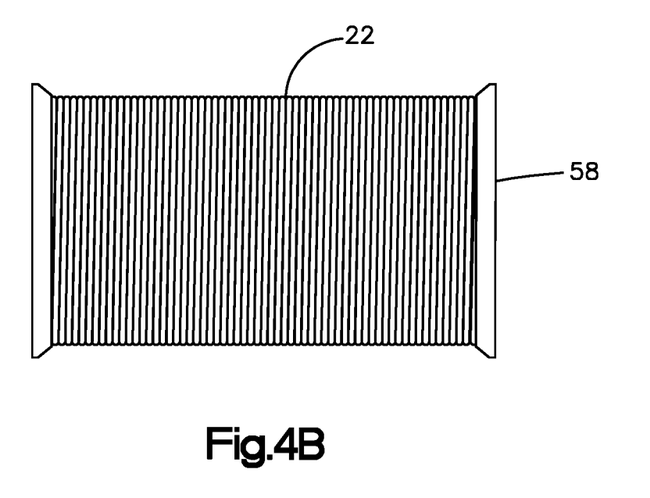
FIG. 4B is a perspective view of a spool of guard member material configured to be cut into the guard member illustrated in FIG. 4A.

Referring now to FIGS. 4A-4B, the weed guard member 22 defines a free first end 44 and a free second end 46 opposite the first end 44. The weed guard member 22 is elongate from the first end 44 to the second end 46. For instance, the weed guard member 22 can be elongate along a weed guard member axis from the first end 44 to the second end 46. The weed guard member 22 can be inelastically flexible. Further, the weed guard member 22 can be a single monolithic structure from the first end 44 to the second end 46. In one example, the weed guard member 22 can be configured as a monofilament, a fluorocarbon, a co-polymer. For instance, the weed guard member 22 can be configured as a wire. The wire can be made of a metal or plastic. For instance, the guard member 22 can be a fishing line. Thus, the guard member 22 can be made of at least one of nylon, polyvinylidene fluoride (PDVF), polyethylene, polyethylene terephthalate, and ultra high molecular weight polyethylene (UHMWPE).

Referring again to FIGS. 2A-2C, the first guard body 25 can be made of any suitable material, such as a polymer, a metal, or the like. The first guard body 25 can be injection molded, or alternatively fabricated using any suitable fabrication process as desired. The first guard body 25 can define a first guard attachment member 45 and a second guard attachment member 50 that are each configured to attach the first guard body 25 to the weed guard member 22. For instance, the first guard attachment member 45 can be configured to attach to the first end 44 of the weed guard member 22. In one example, the first guard attachment member 45 can include a first guard attachment aperture 48 that extends at least into the second end 38 of the first weed guard body 25 along a first guard attachment aperture axis 37 so as to define a first opening at the second end 38 of the weed guard body 25. In this regard, the first guard attachment member 45 can be configured as a first guard attachment tube. The first guard attachment aperture 48 can be configured to receive the guard member 22 that extends through an eyelet. The eyelet can be defined by the eyelet 28 of the fishing hook 21, and can thus be supported relative to the distal end 30 of the fishing hook 21. Alternatively, the eyelet be defined by a leader, or any suitable alternative eyelet that is supported relative to the fishing hook 21, and thus is supported relative to the distal end 30 of the fishing hook 21. For instance, the eyelet can be defined by a knot of the fishing line that attaches, directly or indirectly, to the hook. Alternatively, the eyelet can be defined by a fishing lure that, in turn, carries one or more hooks. The hook can be a single hook, double hook, treble hook or the like. The eyelet can be fixedly supported relative to the distal end 30 of the fishing hook 21, or can be movable with respect to the distal end 30. The leader or fishing line can attach, directly or indirectly, to the fishing lure.

The first guard attachment aperture 48 can be disposed at a location adjacent the hook attachment aperture 42. The first guard attachment aperture 48 can be sized to receive the weed guard member 22. For instance, the first guard attachment aperture 48 can be configured to receive the first end 44 of the weed guard member 22. In particular, the first end 44 of the weed guard member 22 can be inserted into the first guard attachment aperture 48 at the second end 36 of the first guard body 25. The first guard attachment aperture 48 can extend through the first guard body 25 from the first end 36 to the second end 38. The first guard attachment aperture 48 can have a cross-sectional dimension sufficient to cause the weed attachment member 22, and in particular the first end 44, to be press-fit therein. Thus, the cross-sectional dimension of the aperture 48 can be slightly less than that of the weed guard member 22. The first guard body 25 can be a compressible, flexible, or elastic material so as to apply a retention force against the guard member 22 that extends into or through the first guard attachment aperture 48. In one example, the first end 44 of the guard member 22 can extend through the first guard attachment aperture 48 so as to extend out the first guard attachment aperture at the first end 36 of the first weed guard body 25. Thus, it can be said that the first end 44 of the guard member 22 can extend out the first end 36 of the weed guard body 25 in the rearward direction. Alternatively, the first end 44 of the guard member 22 can terminate at a location between the first end 36 and the second end 38 of the weed guard body 25 in the first guard attachment aperture 48. In another example the first guard attachment aperture 48 can terminate between the first and second ends 36 and 38 of the first guard body 25.

Reference now to FIGS. 2A-3B, the first guard body 25 can define a second guard attachment member 50 that is configured to attach the first guard body 25 to the weed guard member 22. For instance, the second guard attachment member 50 can be configured to attach to the second end 46 of the weed guard member 22. In one example, the second guard attachment member 50 can include a second guard attachment aperture 52 that extends at least into the second end 38 of the first weed guard body 25 along a second guard attachment aperture axis 39 so as to define a second opening at the second end 38 of the weed guard body 38. In this regard, the second guard attachment member 50 can be configured as a second guard attachment tube.

The second guard attachment aperture 52 can be configured to receive the guard member 22 that extends through an eyelet. The eyelet can separate the guard member 22 into a first segment 53 that defines the first end 44, and a second segment 55 that defines the second end 46. The first segment 53 can extend from the eyelet to the first end 44. The second segment 55 can extend from the eyelet to the second end 46. As described above, the eyelet can be defined by the eyelet 28 of the fishing hook 21, and is thus supported relative to the distal end 30 of the fishing hook 21. Alternatively, the eyelet can extend through an eyelet defined by a leader, or any suitable alternative eyelet that is supported relative to the fishing hook 21, and thus is supported relative to the distal end 30 of the fishing hook 21. It should be appreciated that the hook 21 can be carried by a fishing lure, such that the fishing lure can replace and define the stem 26. Thus, the guard member 22 can span at least a portion of the lure as it extends from the eyelet to the hook 21.

The second guard attachment aperture 52 can be disposed at a location adjacent the hook attachment aperture 42. The second guard attachment aperture 52 can be sized to receive the weed guard member 22. For instance, the second guard attachment aperture 52 can be configured to receive the second end 46 of the weed guard member 22. In particular, the second end 46 of the weed guard member 22 can be inserted into the second guard attachment aperture 52 at the second end 36 of the first guard body 25. The second guard attachment aperture 52 can extend through the first guard body 25 from the first end 36 to the second end 38. The second guard attachment aperture 52 can have a cross-sectional dimension sufficient to cause the weed attachment member 22, and in particular the second end 46, to be press-fit therein. Thus, the cross-sectional dimension of the second guard attachment aperture 52 can be slightly less than that of the weed guard member 22. The first guard body 25 can be a compressible material so as to apply a retention force against the guard member 22 that extends into or through the second guard attachment aperture 52. In one example, the second end 46 of the guard member 22 can extend through the second guard attachment aperture 52 so as to extend out the second guard attachment aperture 52 at the first end 36 of the first weed guard body 25. Thus, it can be said that the first end 44 of the guard member 22 can extend out the first end 36 of the weed guard body 25 in the rearward direction. Alternatively, the second end 46 of the guard member 22 can terminate at a location between the first end 36 and the second end 38 of the weed guard body 25 in the second guard attachment aperture 52. In another example the second guard attachment aperture 52 can terminate between the first and second ends 36 and 38 of the first guard body 25.

As disclosed above, each of the first guard attachment aperture 48 and the second guard attachment aperture 52 can be disposed adjacent the hook attachment aperture 42. For instance, the hook attachment aperture 42 can be disposed between the first guard attachment aperture 48 and the second guard attachment aperture 52 with respect to a lateral direction A1 of the weed guard body 25 that is substantially perpendicular to the longitudinal direction L1. Thus, the hook attachment member 40 can be referred to as a central attachment member. The first guard attachment member 45 can be referred to as a first outer member or first outer attachment member. The second guard attachment member 50 can be referred to as a second outer member or second outer attachment member. The hook attachment member 40 can be disposed between the first and second guard attachment members 45 and 50. For instance, the hook attachment member 40 can be disposed between the first and second guard attachment members 45 and 50 in a plane that is defined by the longitudinal direction L1 and the lateral direction A1.

Similarly, the hook attachment aperture 42 can be referred to as a central attachment aperture. The first guard attachment aperture 48 can be referred to as a first outer aperture or first outer attachment aperture. The second guard attachment aperture 52 can be referred to as a second outer member or second outer attachment aperture 52. The hook attachment aperture 42 can be disposed between the first and second guard attachment apertures 48 and 52. For instance, the hook attachment aperture 42 can be disposed between the first and second guard attachment members 48 and 52 in a plane that is defined by the longitudinal direction L1 and the lateral direction A1. Further, one or both of the first and second guard attachment aperture axes 37 and 39 can flare away from the other of the first and second guard attachment aperture axes 37 and 39 and the hook attachment aperture axis 59 along the lateral direction L1 of the guard body 25 as they extend in the forward direction.

The hook attachment member 40, the first guard attachment member 45, and the second guard attachment member 50 can be flexible. Thus, the hook attachment member 40 can ride along the hook 21 as it is positioned on the hook. The guard attachment members 45 and 50 can be positionally adjusted to correspondingly adjust the trajectory of the guard member 22 as it extends forward from the first guide body 25.

The first weed guard body 25 can include at least one webbing connected between respective ones of the first guard attachment member 45, the hook attachment member 40, and the second guard attachment member 50. For instance, the first weed guard body 25 can include a first webbing 54 that extends from the central attachment member 40 to the first guard attachment member 45. The first weed guard body 25 can further include a second webbing 56 that extends from the central attachment member 40 to the second guard attachment member 50. The webbings 54 and 56 can have a height along a transverse direction T1 of the weed guard body 25 that is substantially perpendicular to each of the longitudinal direction L1 and the lateral direction A1.

The first and second webbings 54 and 56 can be monolithic with each other, the first guard attachment member 45, the hook attachment member 40, and the second guard attachment member 50. Thus, the first weed guard body 25 can be a unitary monolithic structure as desired. The first and second webbings 54 and 56 can further be more flexible in the transverse direction T1 than each of the first guard attachment member 45, the hook attachment member 40, and the second guard attachment member 50. Accordingly, the webbings 54 and 56 can be deflected as desired so as to adjust the trajectory of one or more of the hook attachment aperture 42, the first guard attachment aperture 48, and the second guard attachment aperture 52.

The height of each of the webbings 54 and 56 can be less than that of each of the first guard attachment member 45, the hook attachment member 40, and the second guard attachment member 50. Further, the height of the first guard attachment member 45 can be substantially equal to the height of the second guard attachment member 50. Further still, the height of the hook attachment member 40 can be greater than the height of one or both of the first and second guard attachment members 45 and 50. As used herein, the term "substantially" takes into account factors such as manufacturing tolerance that can affect stated values, sizes, shapes, dimensions, and positions. In one example, the term "substantially" can refer to plus or minus 10%, such as 5%, such as 4%, such as 3%, such as 2%, such as 1% percent of the stated value, size, shape, and position.

In one example, the first and second guard attachment members 45 and 50 can flare away from each other as they extend in the forward direction that is from the first end 36 to the second end 38. Further, the first and second guard attachment members 45 and 50 can be symmetrical about the hook attachment member 40. Further, the entire first guard body 25 can be symmetrical about the central attachment member. Because the hook attachment aperture 42 is configured to receive the hook 21, and the guard attachment apertures 48 and 52 are configured to receive the guard member 22, the hook attachment aperture 42 can have a greater cross section than that of each of the first and second guard attachment apertures 48 and 52.

Each of first and second guard attachment members 45 and 50, and in particular each of the first and second first guard attachment apertures 48 and 52, can extend along the respective first and second central axes. The central axes can cross each other at a location rearward of the front end of the weed guard body. For instance, the central axes can cross each other at a location rearward of the weed guard body. In one example, the central axes can intersect each other at the location where they cross each other. Alternatively, the central axes can be offset from each other at the location where they cross each other.

Further, the hook attachment member 40 can extend out from the first and second webbings 54 and 56 along the forward direction, such that the first end at the hook attachment member 40 is spaced from the webbings 54 and 56 in the forward direction. Thus, the opening of the first guard attachment aperture 48 can be spaced from the webbings 54 and 56 in the forward direction. Further, one or both of the first and second guard attachment members 45 and 50 can extend out from the first and second webbings 54 and 56 along the forward direction, such that the first end at one or both of the first and second guard attachment members 45 and 50 is spaced from the webbings 54 and 56 in the forward direction. Thus, the first and second openings of the first and second guard attachment members 45 and 50, respectively, can be spaced from the webbings 54 and 56 in the forward direction. Accordingly, the first and second opening can be offset from the first and second webbings 54 and 56, respectively, along the respective first and second central axes. The first and second guard attachment members 45 and 50 at the second end 36 of the first guard body 25 can be recessed in the rearward direction with respect to the hook attachment member 40 at the second end 36.

The second weed guard body 27 can be constructed as described above with respect to the first weed guard body 25. Thus, the second weed guard body 27 can be substantially (e.g., within manufacturing tolerances) identical to the first weed guard body 25. During operation, the second weed guard body 27 can be disposed between the eyelet and the first weed guard body 25. Further, the first end 36 of the second weed guard body 27 can abut the eyelet. The second weed guard body 27 can be suspended by the weed guard member 22 at a location between the eyelet and the first weed guard body 25. Thus, the second weed guard body 27 can be spaced from the stem of the hook 21 or the fishing lure along the transverse direction T. The weed guard member 22 can extend from the eyelet, through the second weed guard body, and to the first weed guard body 25. Thus, the weed guard member 22 can extend at a location spaced from the stem along the transverse direction.

The first end 44 of the weed guard member 22 can be inserted through the first guard attachment aperture 48 of the second weed guard body 27. Thus, the first segment 53 of the weed guard member 22 can extend through the first guard attachment aperture 48 of the second weed guard body 27. Further, the first end 44 of the weed guard member 22 can extend or through the first guard attachment aperture 48 of the first weed guard body 25. Thus, the first segment 53 of the weed guard member 22 can extend from the eyelet, through the second weed guard body 27, and into or through the first weed guard body 25.

The second end 46 of the weed guard member 22 can be inserted through the second guard attachment aperture 52 of the second weed guard body 27. Thus, the second segment 55 of the weed guard member 22 can extend through the second guard attachment aperture 52 of the second weed guard body 27. Further, the second end 46 of the weed guard member 22 can extend or through the second guard attachment aperture 52 of the first weed guard body 25. Thus, the second segment 55 of the weed guard member 22 can extend from the eyelet, through the second weed guard body 27, and into or through the first weed guard body 25. In particular, the weed guard member 22 can extend out the second end 38 of the first and second guard attachment apertures 48 and 52 of the second weed guard body 27 to the second end 38 of the first and second guard attachment apertures 48 and 52 of the first weed guard body 25.

Accordingly, the first and second segments 53 and 55 can be defined by a single strand of the weed guard member 22. Alternatively, the first and second segments 53 and 55 of the weed guard member 22 can be separate strands of the weed guard member 22. Thus, instead of extending through the eyelet, the first segment 53 can extend from the first guard attachment aperture 48 of the first weed guard body 25 to the first guard attachment aperture 48 of the second weed guard body 27. Similarly, the second segment 55 can extend from the second guard attachment aperture 52 of the first weed guard body 25 to the second guard attachment aperture 52 of the second weed guard body 27. The second weed guard body 27 can, in turn, be attached or otherwise supported by the hook 21 or fishing lure.

Alternatively still, the kit, and thus the weed-guarded fishing hook assembly 20, can be devoid of the second weed guard body 27. Thus, the weed guard member 22 can extend through the eyelet, and into the first weed guard body 25 without first passing through the second weed guard body 27. It should be further appreciated that in all examples described herein, instead of extending through an eyelet, the weed guard member 22 can extend around or can be wrapped around any suitable support structure so as to support the weed guard member 22 at a location opposite the first weed guard body 25. For instance, the support structure can be defined by the hook 21, the fishing lure, the fishing line, the leader, or the like.

The weed guard member 22 can be supported by the at least one weed guard body such that the first and second segments 53 and 55 are offset with respect to the stem 26 or fishing lure along the lateral direction A. Further, a plane that extends through the stem and is defined by the longitudinal direction L and the transverse direction T can extend between the first and second segments 53 and 55 of the weed guard member 22. The first weed guard body 25 can be disposed between the distal end 30 of the hook 21 and the stem 26 or fishing lure with respect to the transverse direction T of the hook 21. For instance, the first weed guard body 25 can be disposed at the bent distal interface 33 of the hook 21.

It is recognized that in some examples the fishing hook 21 does not extend into or through the second weed guard body 27. Thus, the second weed guard body 27 can be devoid of the hook attachment member 40. Accordingly, the second weed guard body 27 can be constructed as described herein with respect to the first weed guard body 25 with the exception of the hook attachment member 40. It may nonetheless be desirable to construct the second weed guard body 27 as described above with respect to the first weed guard body 25 including the hook attachment member 40 for ease of manufacturing. Thus, a plurality of weed guard bodies can be manufactured. Some of the weed guard bodies can be used as the first weed guard body 25, and others of the weed guard bodies can be used as the second weed guard body 27.

Referring now to FIGS. 1-4B, a kit can be provided that includes one more, up to all, of the first weed guard body 25, the second weed guard body 27, the weed guard member 22, and the hook 21. The kit can further include a lure that, in turn, supports the hook as described above. The weed guard member 22 of the kit can be provided at one of several potentially desired lengths from the first end to the second end. Alternatively, the kit can include a plurality of weed guard members 22 having different lengths. Alternatively still, the kit can include a first length of weed guard member 22 that can be greater than the desired length. Thus, a user can cut the weed guard member 22 to a desired reduced length. For instance, the kit can include a spool 58, and the weed guard member 22 can be wound about the spool. The user can cut the weed guard member 22 to the desired reduced length, feed it through the eyelet, and attach it to the first weed guard body 25 and, if desired, to the second weed guard body.

The respective positions of the first and second guard attachment members 45 and 50 of the first weed guard body 25 and, if applicable the second weed guard body 27, can be adjusted to define the trajectory of the first and second segments 53 and 55, respectively, of the weed guard member 22.

A method of assembling the weed-guarded fishing hook assembly 20 can include the step of feeding the guard member 22 through the eyelet so as to define the first and second segments 53 and 55 of the guard member that extend from opposite sides of the eyelet. The eyelet can be defined by the fishing hook 21, a fishing lure, a leader that attaches to fishing line and the fishing lure, the fishing line itself or can be defined by any suitable alternative structure. The eyelet can be either fixedly or movably supported relative to the distal end of the fishing hook 21. The first weed guard body 25 can be attached to the fishing hook 21. For instance, the distal end 30 of the fishing hook 21 can be fed into the hook attachment aperture 42. The first weed guard body 25 can be positioned such that the at least one central axis of one or both of the guard attachment apertures 48 and 50, and thus the trajectory of the first and second segments 53 and 55 of the weed guard member, that extends forward of the first weed guard body 25 is positioned such that the distal end 30 of the hook is positioned between the at least one central axis and the stem 26 or fishing lure.

The first free end of the first segment 53 of the guard member 22 can be inserted into the first guard attachment aperture 48 of the first weed guard body 25. Similarly, the second free end of the second segment 55 of the guard member 22 can be inserted into or through the second guard attachment aperture 52 of the first weed guard body 25. In one example, the first and second free ends 44 and 46, respectively, can be press-fit into the first and second guard attachment apertures 48 and 52, respectively.

Thus, the guard member 22 can be supported such that the distal end 30 of the hook 21 is disposed between at least a portion of at least one or both of the first and second segments 53 and 55 and the stem 26 or fishing lure with respect to the transverse direction. In some examples, the proximal end 29 of the fishing hook 21 can extend from the fishing lure. In such instances, one or both of the first and second segments 53 and 55 of the weed guard member 22 can extend from the eyelet and span the fishing lure and the stem 26 of the fishing hook 21, and can attach to the first weed guard body 25 that, in turn, is attached to the fishing hook 21 in the manner described above. For instance, the first guard body 25 can be positionally adjusted to correspondingly adjust the respective trajectories of the first and second segments 53 and 55 as they extend out from the first and second guard attachment apertures 48 and 52, respectively, of the first guard body 25. Positioning the first guard body 25 can include adjusting the position of the first and second guard attachment members 45 and 50. Alternatively, the distal end 30 of the hook 21 can be fed through a lure prior to feeding the distal end 30 through the first guard body 25. In this regard, the stem 26 of the hook 21 can extend through the lure. The lure can be configured as an artificial lure or live bait.

As described above, the method can further include the step of feeding the first and second segments 53 and 55 through the second guard body 27 prior to feeding the first and second segments 53 and 55 at least into the first guard body 25. The first and second guard attachment members 45 and 50, respectively, can be positionally adjusted to correspondingly adjust the trajectory of the first and second segments 53 and 55 as they extend out from the first and second guard attachment apertures 48 and 52, respectively. During operation, as the weed-guarded fishing hook assembly is dragged through weed beds, the weed guard member 22 shields the hook 21 from weeds, and directs the weeds that would otherwise contact the hook 21 away from the hook 21.

Referring again to FIGS. 2A-2B, the weed guard bodies can include one or more pockets 60 that extend through at least one of the hook attachment member 40 and the weed guard attachment members 45 and 50. The pockets can extend along a direction perpendicular to the axis of the respective aperture, and can extend to the aperture. The pockets 60 can provide visualization windows that allow the user to view the fishing hook 21 and weed guard member 22 as they are feed into the respective aperture. Further, the pockets 60 can allow the user to grasp the respective first and second segments 53 and 55 of the weed guard member 22 and feed it further into or through the respective weed guard attachment apertures 48 and 52. Further still, the pockets 60 can assist during manufacturing of the weed guard body. The pockets that extend into a first side of the guard body 25 can be alternatingly arranged along the longitudinal direction L with respect to the pockets on 60 that extend into a second side of the guard body 25 opposite the first side.

Alternatively, as illustrated in FIG. 2C, one or more up to all of the hook attachment member 40 and the weed guard attachment members 45 and 50 can be devoid of the pockets 60. Thus, the hook attachment member 40 and the weed guard attachment members 45 and 50 can entirely surround the respective hook attachment aperture 42 and the weed guard attachment apertures 48 and 52, respectively, along an entirety of the respective lengths of the apertures 42, 48, and 52 as illustrated in FIG. 2C.

As illustrated in FIGS. 2A-2B, the hook attachment member 40 can define a length from the first end 36 to the second end 38 along the central axis of the hook attachment aperture that is equal to or less than the length of either or both of the weed guard attachment members 45 and 50 from the first end to the second end 38 along the central axes of the weed guard attachment apertures 48 and 52, respectively. In one example, the length of the first weed guard attachment member 45 can be substantially equal to the length of the second weed guard attachment member 50. As illustrated in FIG. 2C, the length of the hook attachment member 40 can be greater than the length of either or both of the first and second weed guard attachment members 45 and 50.

Although there has been shown and described the preferred embodiment of the present disclosure, it will be readily apparent to those skilled in the art that modifications may be made thereto which do not exceed the scope of the appended claims. The embodiments described in connection with the illustrated embodiments have been presented by way of illustration, and the present invention is therefore not intended to be limited to the disclosed embodiments. Furthermore, the structure and features of each the embodiments described above can be applied to the other embodiments described herein. Accordingly, those skilled in the art will realize that the invention is intended to encompass all modifications and alternative arrangements included within the spirit and scope of the invention, as set forth by the appended claims.

I claim:

1. A weed guard body configured to attach to a fishing hook, the weed guard body comprises a first guard body defining a first end and a second end opposite the first end, the weed guard body comprising:

a central attachment member that is configured to receive the fishing hook at the first end such that a free end of the fishing hook extends out the second end;
   a first outer member, wherein the weed guard body defines a first outer aperture that extends at least into the first outer member so as to define a first opening; and
   a second outer member, wherein the weed guard body defines a second outer aperture that extends at least into the second outer member so as to define a second opening,
   wherein the central attachment member is disposed between the first and second outer members, and
   wherein at least one of the first and second outer apertures is configured to receive a guard member that extends through an eyelet.

2. The weed guard body as recited in claim 1, wherein the central attachment member, the first outer member, and the second outer member are monolithic with each other.

3. The weed guard body as recited in claim 1, wherein the central attachment member has a height greater than each of the first and second outer members.

4. The weed guard body as recited in claim 3, wherein the height of the first outer member is substantially equal to the height of the second outer member.

5. The weed guard body as recited in claim 1, wherein the first and second outer members are substantially symmetrical about the central attachment member.

6. The weed guard body as recited in claim 1, wherein the first and second outer members flare away from each other in a forward direction from the first end to the second end.

7. The weed guard body as recited in claim 1, further comprising a first webbing that extends from the central attachment member to the first outer member, and a second webbing that extends from the central attachment member to the second outer member.

8. The weed guard body as recited in claim 7, wherein the first and second webbings have a height less than a respective height of each of the central attachment member, the first outer member, and the second outer member.

9. The weed guard body as recited in claim 8, wherein the central attachment member extends out from the first and second webbings along a forward direction from the first end to the second end, such that the second end at the central attachment member is spaced from each of the first and second webbings in the forward direction.

10. The weed guard body as recited in claim 9, wherein each of the first and second outer members extends out from the first and second webbings, respectively, along respective first and second central axes of the first and second attachment apertures, such that the first and second opening are offset from the first and second webbings, respectively, along the respective first and second central axes.

11. The weed guard body as recited in claim 1, defining a central attachment aperture that extends at least into the first end at the central attachment member, wherein the central attachment aperture is configured to receive the free end of the fishing hook.

12. The weed guard body as recited in claim 11, wherein the central attachment aperture, the first outer aperture, and the second outer aperture are coplanar with each other.

13. The weed guard body as recited in claim 1, wherein the first and second outer apertures is configured to receive opposed first and second segments, respectively, of the guard member.

14. A weed guard kit comprising:
   the weed guard body as recited in claim 1; and the guard member, wherein the guard member defines a free first end and a free second end that are configured to be inserted into the first and second outer apertures, respectively.

15. The weed guard kit as recited in claim 14, wherein the first and second free ends are configured to be press-fit into the first and second outer apertures, respectively.

16. The weed guard kit as recited in claim 15, wherein the guard member is elongate so as to extend from the first outer aperture, through the eyelet, and into the second outer aperture.

17. The weed guard kit as recited in claim 14, wherein the guard member comprises a fishing line.

18. A weed guard kit comprising:
the weed guard body as recited in claim 1 defining a first weed guard body; and
a second weed guard body defining apertures that extend therethrough through the second weed guard body and receive the guard member.

19. The weed guard kit as recited in claim 18, wherein at least one of the apertures of the second weed guard body extends therethrough, such that the at least one of the apertures is configured to receive the guard member that, in turn, extends into at least one of the apertures of the first weed guard body.

20. The weed guard kit as recited in claim 19, further comprising the guard member.

\* \* \* \* \*